United States Patent
Biegelsen et al.

(10) Patent No.: US 12,157,273 B2
(45) Date of Patent: Dec. 3, 2024

(54) APPARATUS AND METHOD FOR SUPPORTING AND EXTRACTING A BUILD PART FORMED IN AN ADDITIVE MANUFACTURING PROCESS

(71) Applicant: Palo Alto Research Center Incorporated, Palo Alto, CA (US)

(72) Inventors: David K. Biegelsen, Portola Valley, CA (US); David Mathew Johnson, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 430 days.

(21) Appl. No.: 17/649,140

(22) Filed: Jan. 27, 2022

(65) Prior Publication Data

US 2023/0234290 A1    Jul. 27, 2023

(51) Int. Cl.
| | |
|---|---|
| *B23Q 1/03* | (2006.01) |
| *B29C 64/245* | (2017.01) |
| *B29C 64/379* | (2017.01) |
| *B29C 64/40* | (2017.01) |
| *B33Y 30/00* | (2015.01) |
| *B33Y 40/00* | (2020.01) |
| *B41J 3/407* | (2006.01) |
| *B65G 25/08* | (2006.01) |

(52) U.S. Cl.
CPC .......... *B29C 64/379* (2017.08); *B29C 64/245* (2017.08); *B29C 64/40* (2017.08); *B33Y 30/00* (2014.12); *B33Y 40/00* (2014.12); *B41J 3/4073* (2013.01); *B65G 25/08* (2013.01)

(58) Field of Classification Search
None
See application file for complete search history.

(56) References Cited

U.S. PATENT DOCUMENTS

| | | | |
|---|---|---|---|
| 1,826,783 A | 10/1931 | Hess | |
| 2,968,838 A | 1/1961 | Hicks | |
| 10,633,190 B2 * | 4/2020 | Bidram | B65G 25/08 |
| 2018/0281464 A1 * | 10/2018 | Bradway | B41J 3/4073 |

FOREIGN PATENT DOCUMENTS

WO       00/07830 A1    2/2000

* cited by examiner

*Primary Examiner* — Armand Melendez
(74) *Attorney, Agent, or Firm* — Maginot Moore & Beck LLP (57) ABSTRACT

An apparatus and method are provided for extracting a build part from an additive manufacturing machine. Upon completion of the build part by the additive manufacturing machine, a pin array is placed above the build part, the pin array including a plurality of pins slidably supported by a support plate for vertical movement relative to the support plate. The pin array is moved toward the build part so that the plurality of pins contact the build part and conform to the contour of the build part. The pins of the pin array are locked with the pins in contact with and conforming to the build part. The pin array and build part are inverted so that the build part is supported by the locked pins of the pin array. All of the pins of the array are locked simultaneously by a common locking component. The build plate can be formed on a sacrificial interposer plate that is removed by an etchant bath supported on the pin array when the build part is inverted.

8 Claims, 12 Drawing Sheets

APPARATUS AND METHOD FOR SUPPORTING AND EXTRACTING A BUILD PART FORMED IN AN ADDITIVE MANUFACTURING PROCESS

BACKGROUND

The present disclosure relates to 3D additive printing, and particularly to a method and apparatus for supporting a build part during extraction of the completed 3D part.

Typically, 3D printing, also known as additive manufacturing, involves depositing print material into sequential layers onto build plates until the desired 3D print is formed. The print material will typically bond onto the surface of the build plate. Once the printing process is complete, the bond between the print material and the build plate will need to be broken for the printed object to be removed from the build plate.

The bond between the print material and the surface of the build plate can make it difficult to remove the 3D print from the build plate following completion of the print process. In one approach, the build part is removed by scraping across the surface of the build plate to the print material from the build plate. However, this approach can lead to damage to the 3D print or to the surface of the build plate. In addition, because build plates are typically reused, it is desirable to ensure that all print material is removed from a build plate before beginning a new printing process. In some instances, such removal can be tedious and time consuming as well as potentially harmful to the build plate.

In another approach, an EDM wire is moved across the surface of the build plate to excise the 3D printed part. This approach can damage the build part and the build plate and requires generally elaborate machinery to accurately draw the EDM wire between the 3D part and the build plate.

In another approach, as described in U.S. Pat. No. 9,216,544, the 3d object is printed on a thin film supported on platen. The film is fed from a spool and cut-off when the part is finished. The film is then advanced to collection bin with 3D object adhered to the film. The film can be polycarbonate, acrylic, paper-based, polyester, cellulose, polyamide, polyolefin or other flexible material capable of being provided in a thin sheet and able to sufficiently adhere to platen to prevent curling of the film as the 3D printing process occurs. The film can be held onto platen by vacuum.

In certain additive manufacturing processes, such as the process disclosed in U.S. Pat. No. 9,920,433, the additive manufacturing process includes support structures to be built with the build piece. The support structures may be used, for example, to support overhangs or other geometry in the build piece that is not supported by lower layers of the build piece's geometry.

Upon completion of the 3D build, the build piece is immersed in a chemical etchant bath. The chemical etchant removes the material of the structural support faster than the rest of the build piece, so timing of the etching process is critical. The build piece is designed with a sacrificial thickness beyond the desired final dimensions of the build piece, so that build piece is appropriately dimensioned after the etching process has been terminated. The nature of the chemical etchant depends on the material of the 3D build. When the build piece is made from steel, stainless steel, and Inconel, for instance, the etchant is ferric chloride with HCl. When the build piece is made from titanium, the etchant is hydrofluoric and hydrochloric acid.

SUMMARY OF THE DISCLOSURE

In one aspect of the disclosure, an apparatus is provided for supporting a build part, produced in an additive manufacturing process, during the etching away of the sacrificial interposer on which the part has been built. The apparatus comprises a pin array that includes at least one support plate defining a plurality of holes therethrough and a like plurality of rigid elongated pins, each slidably extending through a corresponding one of the plurality of parallel holes. Each pin includes a tip at one end configured to contact a surface of the build part and an opposite end adjacent a surface of the support plate. Each of the pins is movable relative to the support plate by a force acting on the tip, as the pin array is moved toward the build part, to move the opposite end in a vertical direction away from the surface of the support plate. The apparatus further includes a locking component for engaging each of the plurality of elongated pins to lock the pins against movement in the vertical direction relative to the support plate. The pins can be spring-biased to press the pins into solid contact with the build part and then locked to hold pins in place within the support plate when the pin array is moved away from the build part.

In one feature, a pair of support plates are offset from each other, each plate defining the plurality of parallel holes to receive the like plurality of pins therethrough. The locking component includes a compressible elastomeric composition disposed between the pair of plates. The elastomeric composition defines a like plurality of parallel holes to receive the plurality of pins therethrough. A mechanism is provided for moving one or both of the pair of plates toward the other plate to compress the elastomeric composition between the plates. As the composition is compressed, the Poisson effect causes the elastomeric composition to press against the pins within the holes in the composition, to thereby lock the pins by friction between the pins and the compressed elastomeric composition. The plates are moved together by a mechanical mechanism or by an EMF applied to electrode plates on one or both of the support plates.

In another feature of the disclosure, the locking component can include a movable plate defining a like plurality of parallel holes configured to receive the plurality of pins of the pin array therethrough. The movable plate is supported for movement relative to the support plate in a direction transverse to the vertical direction of movement of the plurality of pins. A translation mechanism is operable to move the movable plate in the transverse direction so that the pins contact respective holes in the movable plate and in the support plate so that friction therebetween restricts movement of the pin in the vertical direction. In one embodiment, the movable plate is sandwiched between two fixed support plates.

The pin array and locking component of the present disclosure permits a simplified and universal method for extracting a build part from an additive manufacturing machine. Upon completion of the build part by the additive manufacturing machine, the pin array is positioned above the build part and is moved toward the build part so that the plurality of pins contact the build part and conform to the contour of the build part. The pins are then simultaneously locked in contact with and conforming to the build part. The pin array and build part are inverted with the pins remaining in contact with the build part, so that the build part is supported by the locked pins of the pin array.

In another aspect, the build part can be formed on a sacrificial interposer plate disposed between the build part and the build plate of the additive manufacturing machine. The pin array and build part are inverted with the interposer plate engaged thereto, so that the interposer plate is exposed. An etchant bath is disposed over the interposer plate, with the bath supported by the locked pin array. After the material of the interposer plate has been removed by the etchant, the etchant bath can be removed from the build part, and the build part can then be extracted from the pin array.

DETAILED DESCRIPTION

Figure 1A:
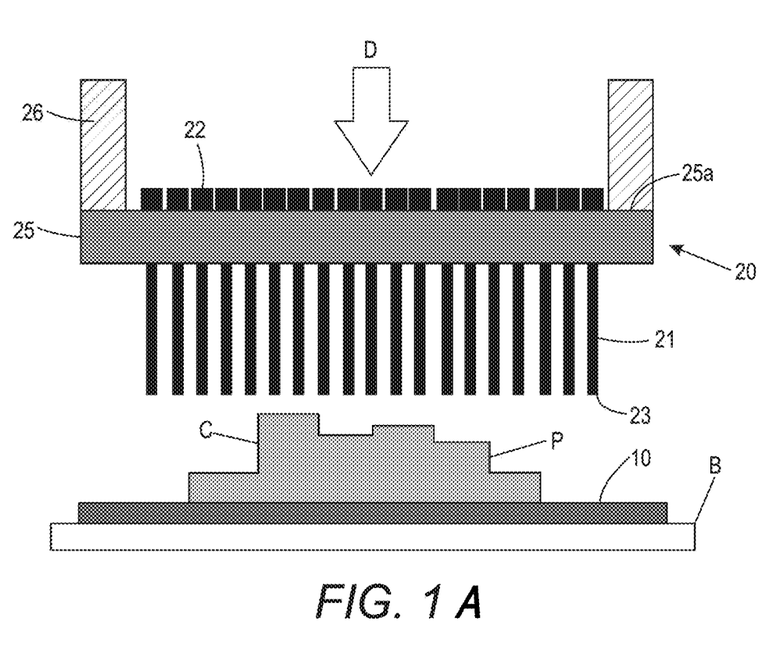
FIG. 1A is side view of a pin array for use in conjunction with an additive manufacturing process, with the pin array shown in an initial or neutral position.
Figure 3:
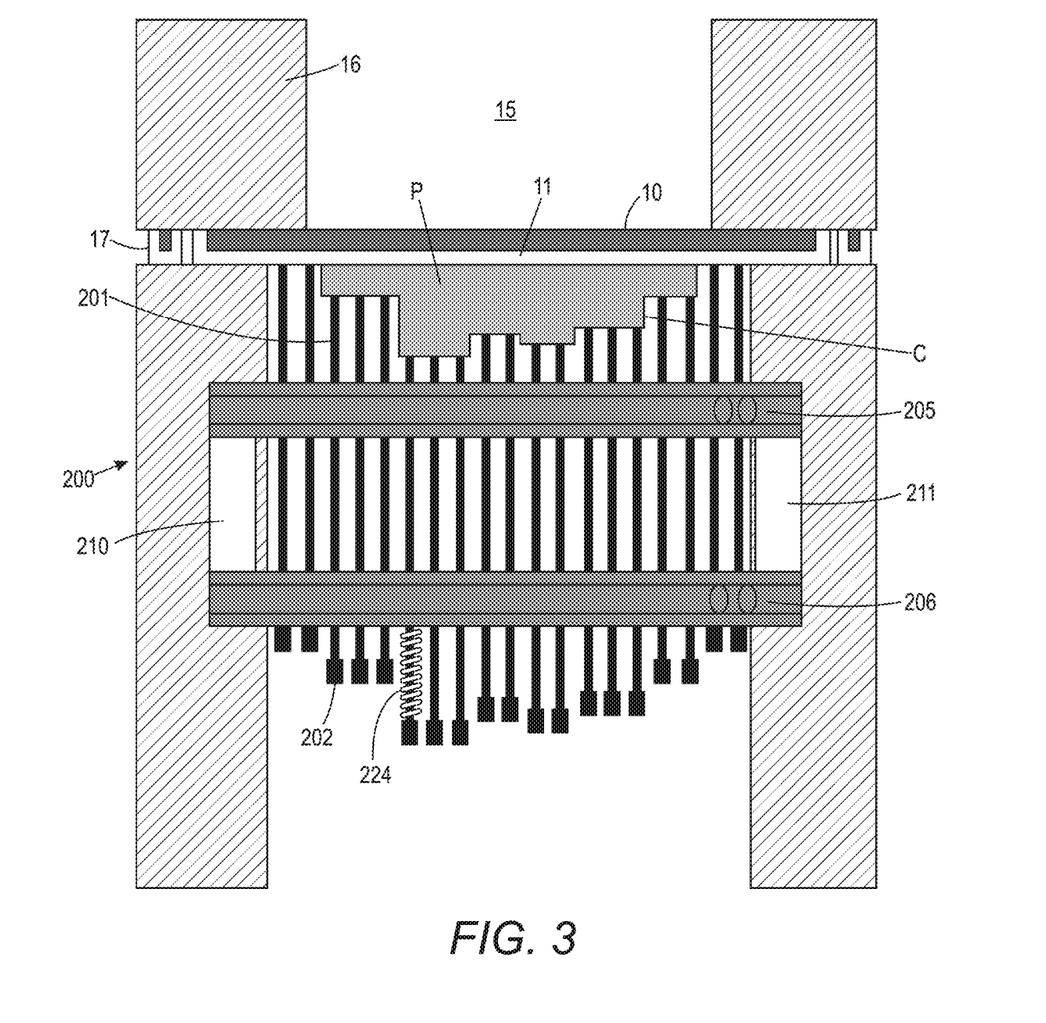
FIG. 3 is a side cross-sectional view of a pin array in an alternative embodiment and showing the build part supported by the pin array for treatment in an etchant bath.

As shown in FIG. 1A, a build part P is formed on a build plate B in an additive manufacturing process, as is known in the art. In one aspect of the disclosure, a thin interposer panel 10 is positioned between the part P and the build plate P so that the additive material is deposited directly on the interposer panel, rather than on the build plate. Moreover, the material of the interposer panel is configured to be removed or dissolved by etching, such as in an electrolytic or chemical bath. In one embodiment, an etch stop layer 11 can be positioned between the interposer panel 10 and the build part P, as shown in FIG. 3. The stop layer 11 is formed of a material that is less susceptible to the etchant used to remove or dissolve the interposer panel 10. The stop layer 11 thus protects the build part P from possible contact with the etchant while the thicker interposer material is removed. The interposer panel can be formed of steel or stainless steel that is susceptible to an etchant composed of ferric chloride with hydrochloric acid, for instance. Alternatively, the interposer panel can be formed of aluminum with an etchant composed of nitric acid, hydrochloric acid and hydrofluoric acid. The stop layer 11 can be formed of a material that is impervious to the etchant, such as certain plastics. including PEEK (polyether ether ketone), or in some cases can be a noble metal or iron oxide on the steel panel.

As shown in FIG. 3, the interposer panel 10 is exposed to etchant in a bath 15. The etchant bath is contained within an enclosure 16 that is supported on the interposer panel 10. The interposer panel is dimensioned to substantially cover the build plate B, as shown in FIG. 1A, and covers a larger area than the build part P, as shown in FIG. 3. The interposer panel is thus sized and configured to support the etchant bath 15 and the enclosure 16. The enclosure 16 can include a seal 17 around the perimeter of the enclosure that engages the frame 208 (described in more detail below) to prevent leakage of the etchant during the process. The seal thus surrounds the interposer panel 10. It is further contemplated that the stop layer 11 can be configured to surround the sides of the interposer panel 10, as shown in FIG. 3, to provide protection against leakage of the etchant.

When the build part P and interposer panel 10 are removed from the additive manufacturing device and build plate B they are mated with the pin array 20. For example, the build part P and interposer panel 10 can be inverted and pressed down against the pin array. The resulting configuration allows the interposer panel 10 to be exposed to the etchant in the etchant bath 15. Consequently, it is necessary to support the newly manufactured build part in the inverted position shown in FIG. 3, particularly towards completion of etching process when the remaining interposer is negligibly thin and structurally weak. It can be appreciated that a typical build part has a contour C that is variable and non-linear. This non-linear contour makes it difficult to support the inverted build part on a flat plate. In one aspect of the present disclosure, a pin array 20 is provided that can adapt to the contour C of the build part P to provide stable and complete support of the inverted part. The pin array 20 includes a plurality of rigid pins 21 slidably extending through complementary parallel holes in a support plate 25. In one embodiment, each pin 21 can include an enlarged head 22 at the opposite end of the pin that is initially supported on a back surface 25a of the plate, as shown in FIG. 1A, and a tip 23 that is configured to engage a surface of the build part P. Preferably, the tip 23 is blunt, either substantially flat or slightly rounded.

Figure 1B:
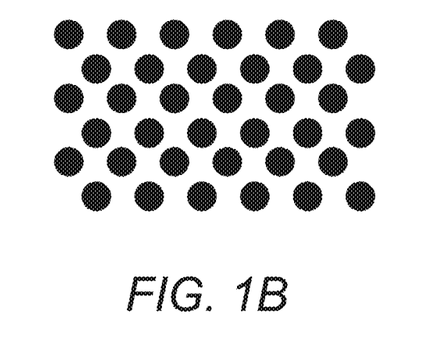
FIGS. 1B-1C are enlarged views of part of the pin array shown in FIG. 1A viewed from below the pin array and showing two different pin cross-sections.
Figure 1C:
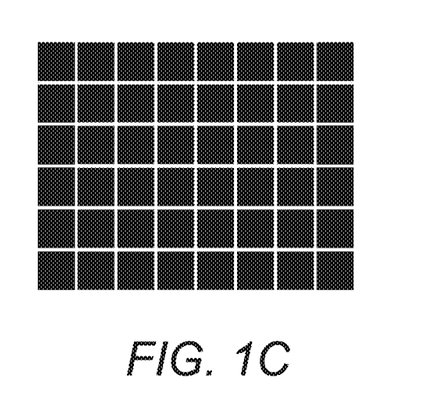

In order to emulate the contour C of the build part as closely as possible, the pin array is densely populated with small diameter pins. Moreover, a dense plurality of pins means that the weight being borne by the pin array 20 is distributed more finely. In a specific example, the pins can have a diameter of 1 mm, a length of 20 cm, and can be arranged in a hexagonal array on 2 mm centers. With this configuration, there are about 25 pins/cm$^2$. For a build part having a weight of 50 grams/cm$^2$, each pin supports 2 grams without buckling. The Euler buckling load for a 1 mm diameter steel rod 20 cm long is over 120 grams, so this form of pin array is capable of supporting a much heavier build part and/or permits the use of longer pins. FIG. 1B shows a bottom-up view of a segment of the pin array with pins having circular cross-section. FIG. 1C is the same view of a pin array segment in which the pins have a non-circular, or square cross-section. In some instances, the square cross-section pin is preferred, such as when the contour of the build part is primarily an arrangement of planar surfaces. Other pin cross-sections are contemplated that are capable of supporting a build part as described herein.

Figure 2A:
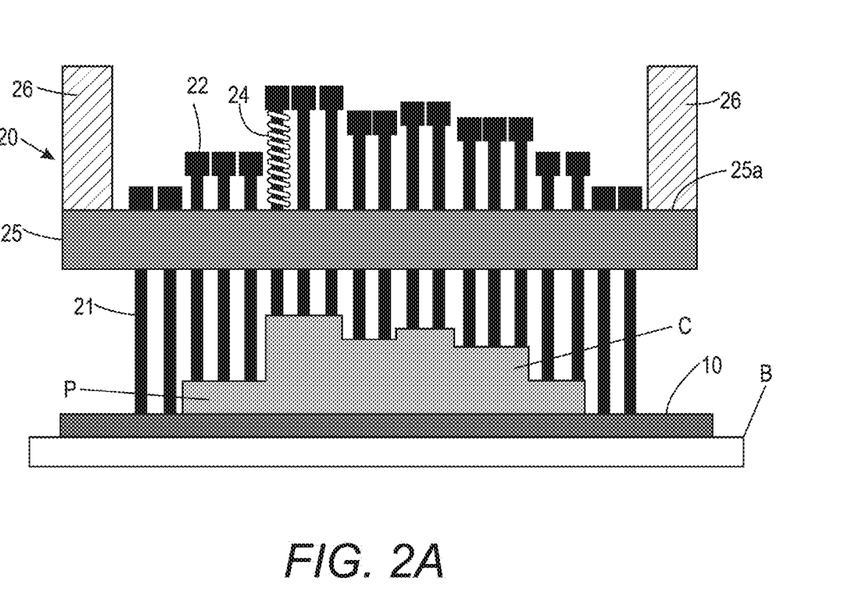
FIG. 2A is side view of the pin array shown in FIG. 1A, with the pin array in an actuated position conforming to the contour of a build part produced by the additive manufacturing process.

The plate 25 of the pin array is supported by a frame 26 that is movable in the direction D toward the finished build part P seated on the build plate B. It can be appreciated that the pin array 20 can be moved into a position above the build part within the printing machine, but preferably the build plate B can be moved from the additive printing machine to a position below the pin array 20. The pin array 20, the frame 26 and the associated mechanism for moving the pin array in the direction D can be an adjunct to the 3D printing machine. The mechanism for moving the pin array can be of any suitable construction that is capable of controllably and evenly moving the pin array in the vertical direction. For instance, the frame 26 can incorporate a rack and pinion mechanism driven by a motor under control of a separate controller. Sensors may be provided to determine when a build part P, and in particular the interposer panel 10, is properly positioned beneath the pin array, and can determine when to stop downward movement of the pin array onto the build part. As shown in FIG. 2A, the pins in the array span an area that is larger than the area of the build part P so that pins at the periphery of the build part contact the interpose panel 10. This contact between pins 21 and the panel 10 can be detected to stop the downward movement of the pin array 20.

As demonstrated in FIG. 2A, as the pin array moves in the direction D, the pins 21 contact the contour C of the build part, or contact the interposer panel 10 if the build part is not in the path of a particular pin. This contact generates a force that moves the pins upward relative to the support plate so that the enlarged head of the pins extend above the back surface 25a of the support plate 25 at variable heights so that the enlarged heads 22 are substantially parallel to the contour C of the build part P. The pins can be "spring-biased", meaning that the support plate 25 incorporates a spring mechanism for each pin that resists movement of the head 22 of each pin away from the back surface 25a and is operable to return the head into contact with the back surface when the pin array is removed from the build part. In one embodiment, the spring mechanism can be an extension spring 24 engaged between the head 22 and the support plate 25 for each pin, as shown in FIG. 2A. The spring 24 is at its free length when the pin array is not in contact with the build part P, and exerts a resistive force when the spring is stretched as the head 22 moves away from the back surface, as shown in FIG. 2A. When the pin array moves away from the build part or when the build part is removed from the pin array, the extension spring returns to its free state, forcing the head 22 of each spring back to its neutral position shown in FIG. 1A. It can be appreciated that the spring 24 can be connected directly to the pin, without the need for the enlarged head 22.

Figure 2B:
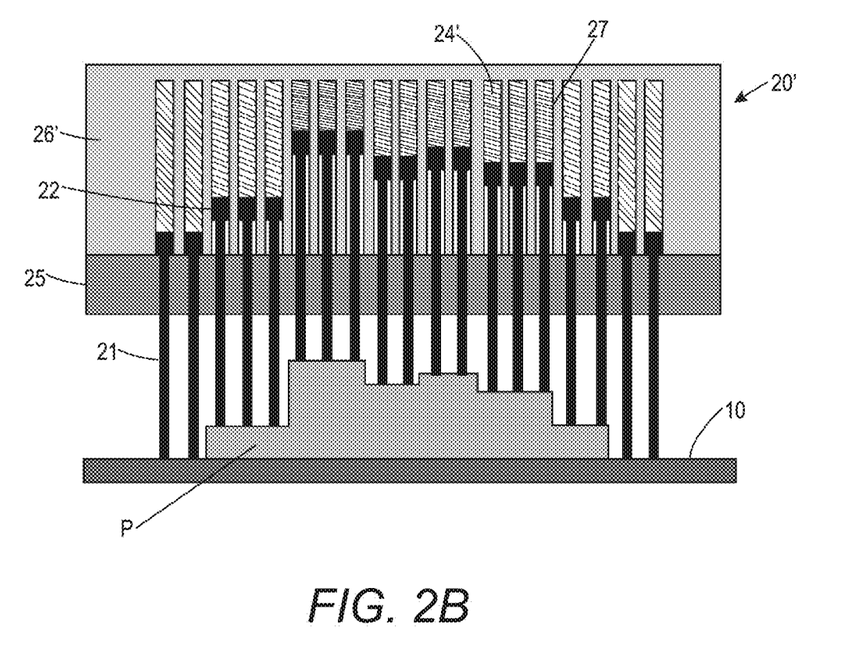
FIG. 2B is a side view of the pin array shown in FIG. 1A incorporating a spring-biasing mechanism.

Another spring biasing mechanism is shown in FIG. 2B for a modified pin array 20'. In this embodiment, the frame 26' is modified from the frame 26 in FIG. 2A to define an array of channels 27 aligned with the pins 21 of the pin array. The end of the pin with the enlarged head 22 is slidably disposed within a corresponding channel 27, with vertical movement resisted by a corresponding compression spring 24'. The spring 24' pushes the pin 21 down against the build part P when the pin array 20' is moved toward the interposer panel 10, and maintains the pin in the position shown in FIG. 1A when the pin array is moved away from the build part. It is contemplated that the pins 21 do not incorporate an enlarged head, but instead can be connected to the compression spring 24' to hold the pin within the channel 27.

As discussed above, the build part P is to be inverted to expose the interposer panel 10 to an etchant bath to remove the panel from the part. With the pins 21 of the pin array 20 in direct contact with the contour C of the build part P, the pin array is in a configuration that can fully and stably support the build part once it is inverted to the position shown in FIG. 3. However, in order to support the build part, the pins 21 of the pin array must be locked in their contour-conforming position. In one aspect of the present disclosure, the pin array 20 is modified to incorporate a locking component for locking the pins in their respective extended positions. In one embodiment, the locking component comprises a pin array 200 that includes two support plates 205, 206 that are supported at vertically offset positions by a frame 208. The frame can be similar to the frame 26 in that it includes a mechanism for moving the entire pin array 200 vertically relative to a build part supported on a build plate. Each support plate 205, 206 defines complementary holes to receive multiple pins 201 that are configured to slide vertically relative to both plates in the same manner as the plate 25. The pins 201 in this embodiment are longer than the pins 21 because the pins must span the distance between the two support plates 205, 206. The pins can be spring-biased in the manner described above, with a spring mechanism incorporated into one of the support plates 205 or 206. For the extension spring embodiment described above, an extension spring 224 can be disposed between the lower plate 206 and the head 202 of each pin 201.

It can be appreciated that the two support plates 205, 206 prevent buckling of the pins 202 under the weight of the build part and etchant bath 15. It is preferred that the uppermost plate 205 reside as close to the top of the build part P as possible. The lowermost plate 206 is offset a sufficient distance from the uppermost plate so that the distance between the plates is close to the distance that the pins project from the uppermost plate to contact the build part and interposer plate 10. In one specific embodiment, the pins have a diameter of 1 mm and a length of 20 cm. For a conventional build part, the pins project beyond the lowermost plate 205 about 10 cm, so the distance between the two plates 205, 206 can be 7-8 cm. The spacing of the plates provides an optimum spacing of the support points for the pins so that the pins are not susceptible to buckling under load.

Figure 4A:
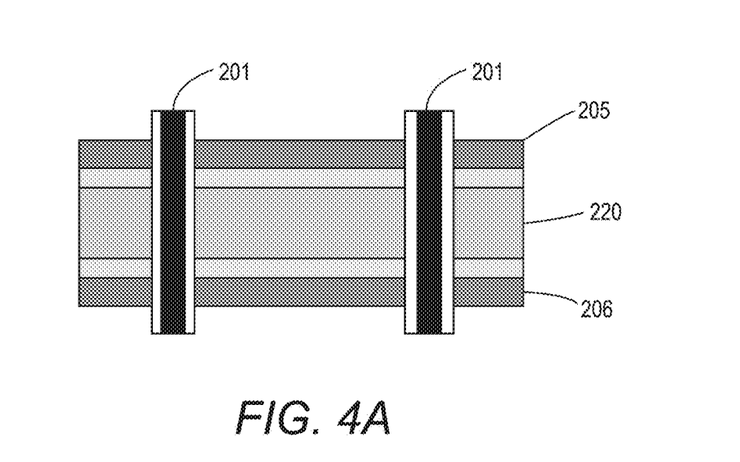
FIGS. 4A-4B are side representations of a locking component for the pin array shown in FIG. 3 in which the locking component includes a compressible elastomeric composition, with the locking component shown in a neutral and actuated configuration.

The frame 208 is shown in cross-section in FIG. 3, but otherwise surrounds the support plates. The support plates 205, 206 are disposed within an annular channel 210 defined in the frame, defining a cavity 211 encompassed by the support plates and the frame. The support plates are vertically movable within the annular channel toward and away from each other. In one feature, the cavity 211 is filled with a compressible elastomeric composition 220, such as a gel or a silicone composition like PDMS (polydimethylsiloxane). As shown in FIG. 4A, the elastomeric composition is capable of being compressed. Holes are defined in the elastomeric composition to receive the pins 201 passing between the two support plates 205, 206. In the un-compressed state of FIG. 4A, the holes are sufficiently large to allow the pins 201 to move freely through the holes so that the pin array can conform to the contour C of the build part P, as described above. However, when the elastomeric composition 220 is compressed between the two plates 205, 206, the holes are deformed as the material expands into the holes, due to the Poisson effect. The expanded elastomeric composition presses against and frictionally holds the pins 201 in position. The friction holds the pins in place even when the build part P is inverted and the weight of the part bears against the pins. The pins may be provided with a roughened surface, at least along the portion of the length of the pins that are engaged by the elastomeric composition. The roughened surface can enhance the frictional resistance to movement of the pins when the elastomeric composition is compressed. The surface roughening can be knurling, a series of circumferential grooves, dimple, or other feature that disrupts the surface of the pins. Alternatively, the surface of the pins can be coated with a material adapted to enhance the frictional engagement, such as neoprene or rubber. The coating can also be compressible to enhance the frictional engagement.

Figure 4B:
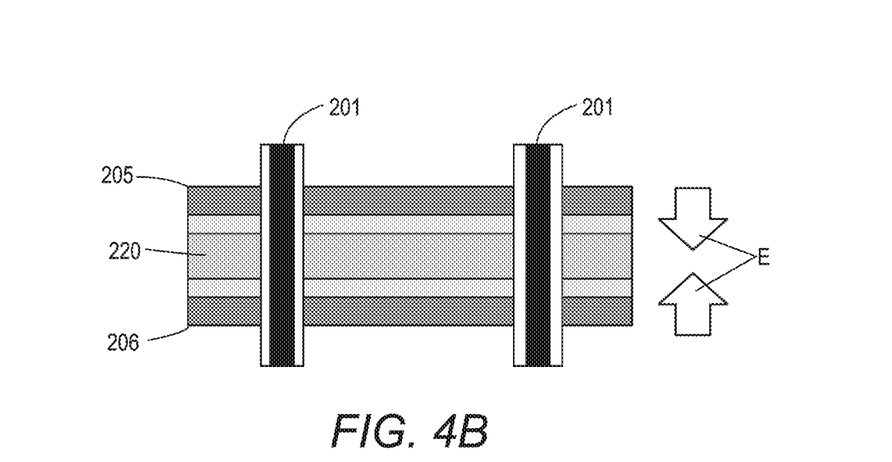
Figure 5:
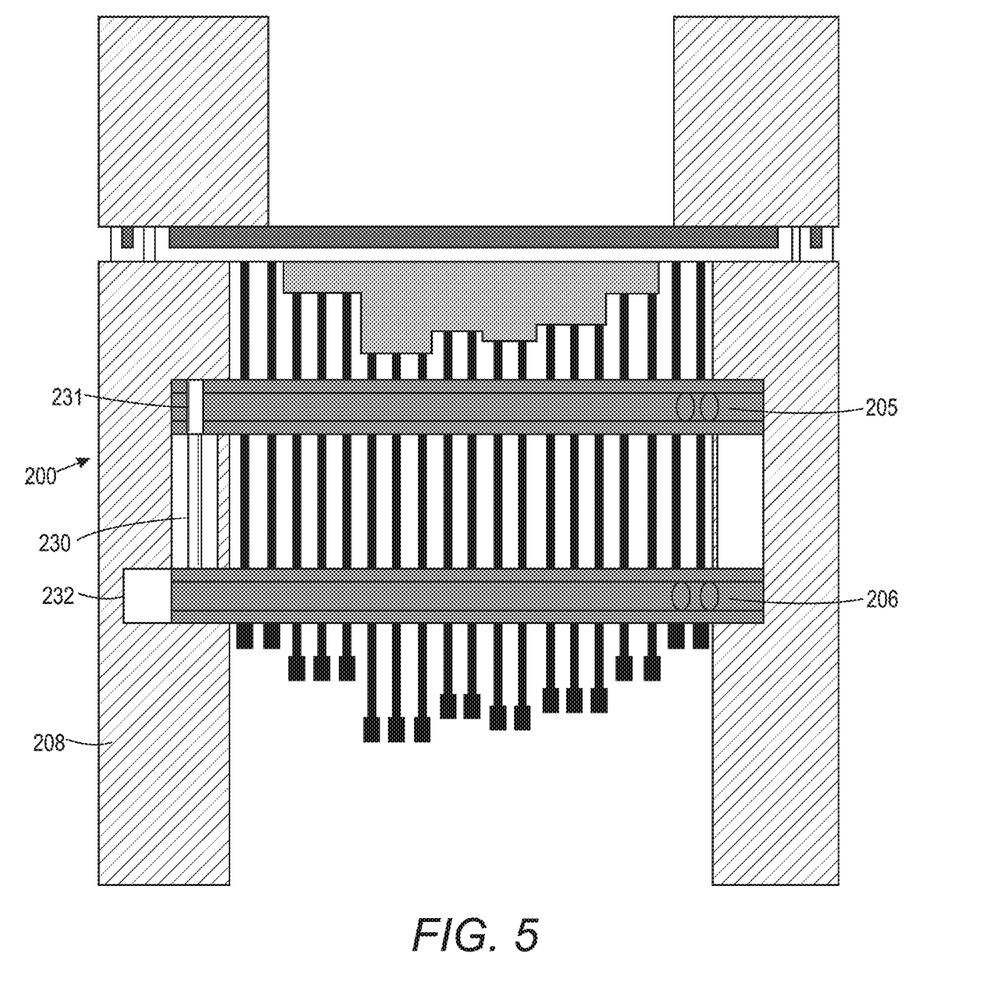
FIG. 5 is a side cross-sectional view of a mechanical mechanism for actuating the locking component shown in FIGS. 4A-4B.

Compression of the elastomeric composition is accomplished by driving the two plates towards each other in the direction E shown in FIG. 4B. One or both of the plates can move vertically toward and away from the other plate. Movement in the direction opposite to direction E allows the elastomeric composition to recover from the compression and expand to the initial configuration shown in FIG. 4A. In one embodiment, a mechanical drive is connected between the two plates. As shown in FIG. 5, the mechanical drive can include a lead screw 230 rotatably supported by one plate, such as plate 206, and engaging a mating threaded bore 231 in the other plate, such as plate 231. The lead screw can be driven by a motor 232 carried by the frame 208 so that rotation of the lead screw moves the plates together and apart. In another embodiment, a rack and pinion mechanism can be connected between the two plates, with a rack supported by one plate and a motor-driven pinion gear rotatably supported by the other plate. In either embodiment, the mechanical drive is motor driven and controllable to drive the two plates together at a predetermined spacing calibrated to compress the elastomeric composition a sufficient amount to clamp the pins in position.

Figure 6A:
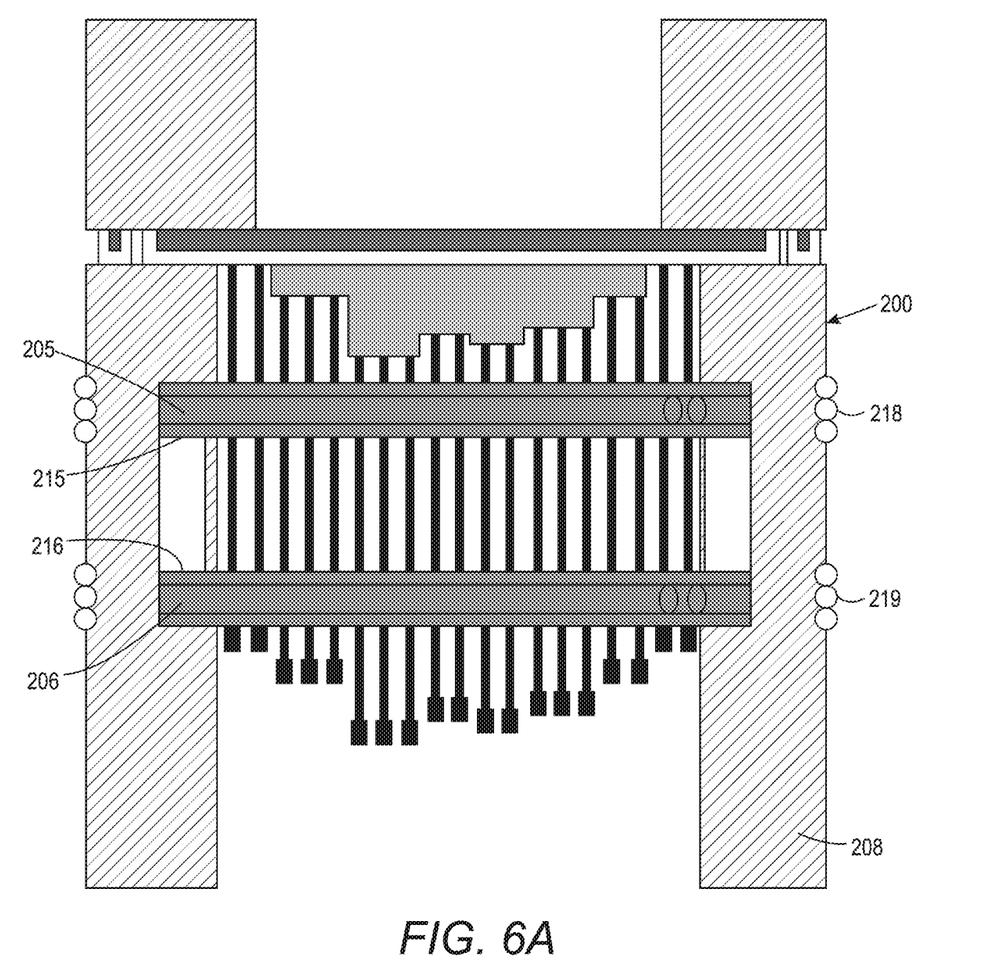
FIG. 6A is a side cross-sectional view of an electrical component for actuating the locking component shown in FIGS. 4A-4B.

In another embodiment, the two plates can be driven together electrically. In particular, one or both plates 205, 206 can include a respective electrode 215, 216, as depicted in FIG. 6A. An electric field can be applied to the pin array 200 which causes one or both electrodes 215, 216, and the corresponding plates, to move towards the other plate in the manner of a plunger or armature of a solenoid, to compress the elastomeric composition between the plates. In this embodiment, the frame 208 can incorporate electrical windings or conductive coils around the outer surface of the frame that are coincident with the support plates. When electrical current is applied to the windings, the windings generate an electromagnetic field that causes the electrode(s) and associated plate(s) to move axially. In the embodiment shown in FIG. 6A, separate windings 218, 219 are provided for a corresponding electrode 215, 216, with the windings having opposite polarity to drive the corresponding plates towards each other. In another embodiment, the electrode of one support plate can constitute an electromagnet that is attracted to the electrode surface of the other support plate when the electromagnet is actuated.

Figure 6B:
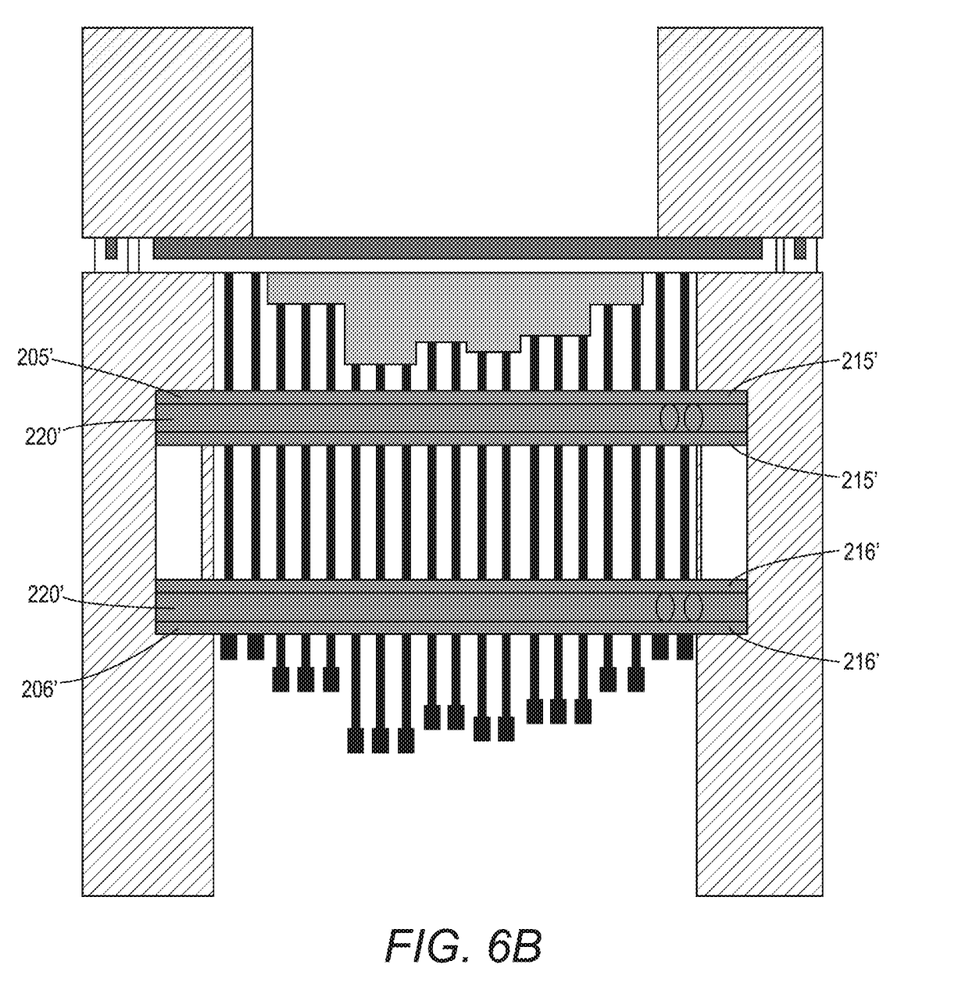
FIG. 6B is a side cross-sectional view of another electrical component for actuating the locking component shown in FIGS. 4A-4B.

In another embodiment shown in FIG. 6B, each support plate 205', 206' includes its own elastomeric composition 220' sandwiched between electrode plates 215' and 216', respectively. One electrode plate for each support plate 205', 206' is connected to a voltage source and the other electrode plate is connected to ground or to another voltage source. When the electrodes of each support plate are energized, the attractive electrostatic force generated between the electrode plates causes the two support plates to move toward each other, thereby compressing the respective elastomeric composition. No voltage is applied to the pins and the elastomeric composition insulates the pins from the voltage applied to the electrode plates 215', 216'.

Figure 7:
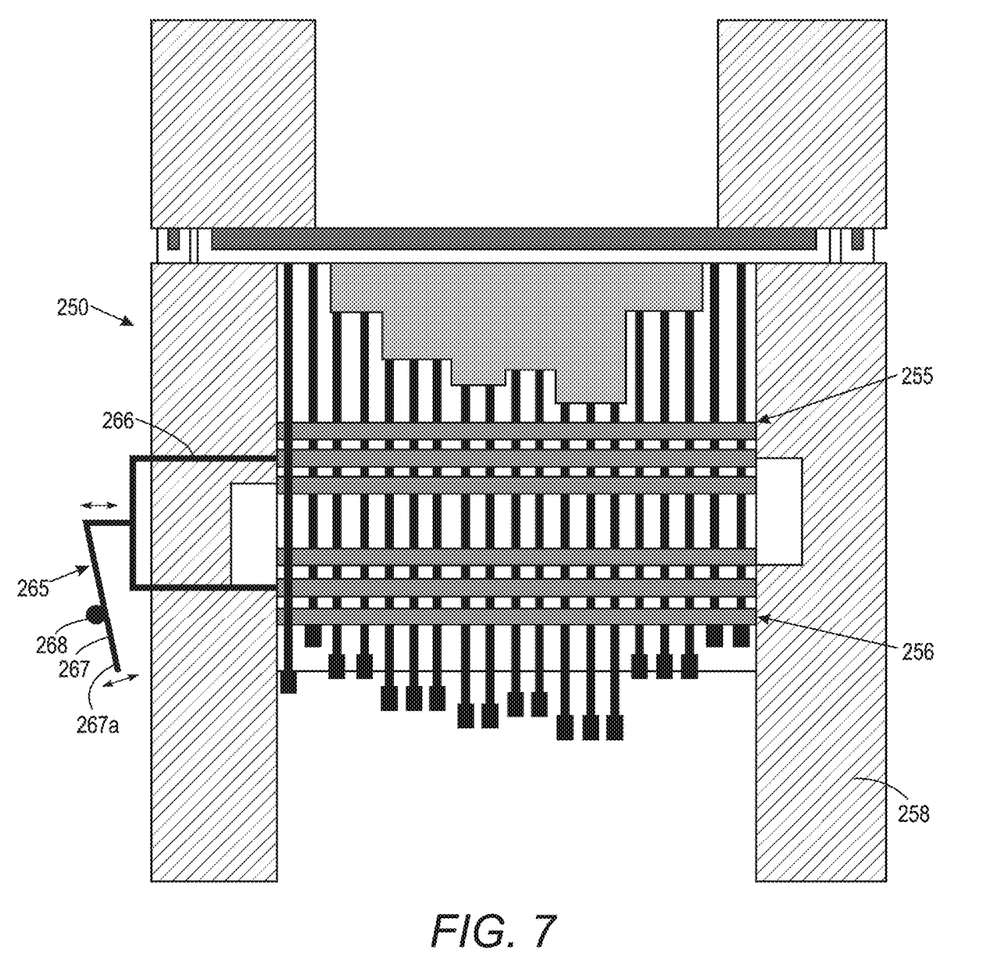
FIG. 7 is a side cross-sectional view of a mechanical locking mechanism for a pin array, such as the pin array shown in FIG. 3
Figure 8:
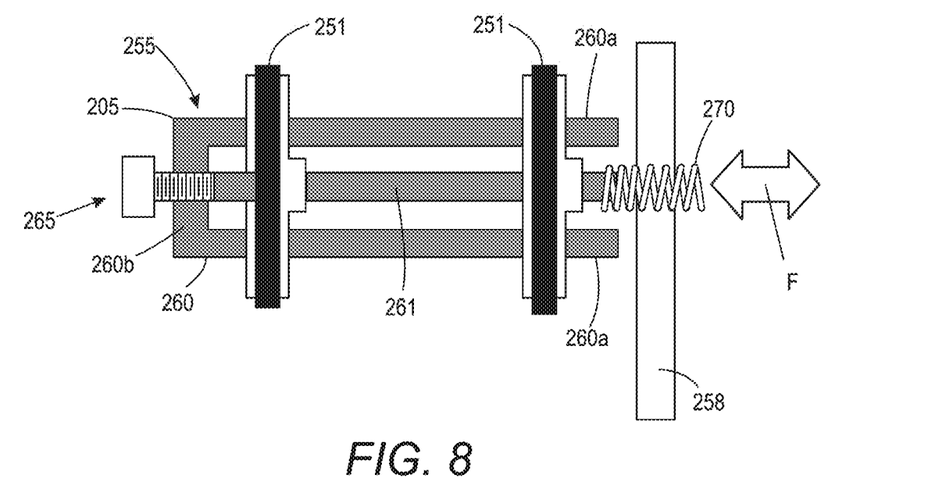
FIG. 8 is an enlarged side of the locking mechanism shown in FIG. 7.

A pin array 250 of a further embodiment is shown in FIGS. 7-8 that incorporates a mechanical locking component to lock the pins 251 in position. The array includes two support plate assemblies 255, 256 supported by a frame 258. The pins 251 and frame 258 can be configured in the same manner as the like components of the prior embodiments so that the pins are adjustable to conform to the contour of the build part in order to support the part when inverted. The locking component is incorporated into one or both of the assemblies, as shown in FIG. 8. The support plate assembly 255 includes a fixed plate arrangement 260 that is fixed within the frame 258. In one embodiment, the fixed plate arrangement 260 has a U-shaped configuration with paced apart prongs 260a extending from a base 260b. A movable plate 261 is disposed between the prongs of the U-shaped fixed plate arrangement. The prongs 260a and the movable plate 261 of the support plate assembly 255 includes colinear parallel holes configure to slidably receive the pins 251 in the manner described above. The movable plate 261 is configured to move relative to the fixed plate arrangement in a direction F that is transverse to the direction of movement D of the pins 251. The movable plate 261 is moved transversely until it contacts and exerts a clamping force on the segment of each pin between the prongs of the fixed plate arrangement 260. The force will also push the pins into engagement with one side of the holes in the prongs of the fixed plate arrangement. The force is not great enough to bend the pins, but is large enough so that friction between the holes of each of the plate portions is sufficient to hold the pins in their vertical position, even under the weight of the inverted build part P and etchant bath. The prongs 260a and movable plate 261 have a thickness calibrated to provide a surface area of contact between the holes of the plates and the pins that produces an optimum friction force to prevent vertical movement of the pins under the weight of the build part and etchant bath. In one embodiment, the prongs and plate can each have a thickness of 1 cm for a 20 cm long pin.

Figure 9A:
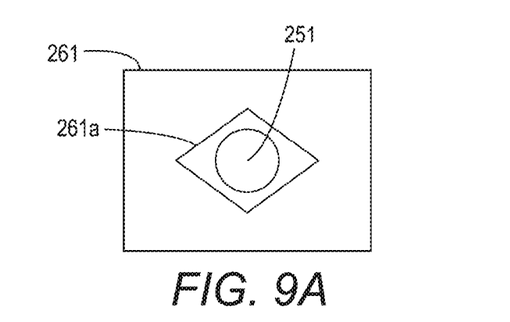
FIGS. 9A, 9B are top views of a pin extending through a non-circular hole in the movable plate of the pin array shown in FIGS. 7-8.
Figure 9B:
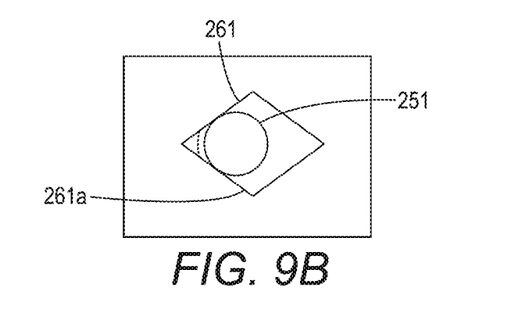
Figure 10A:
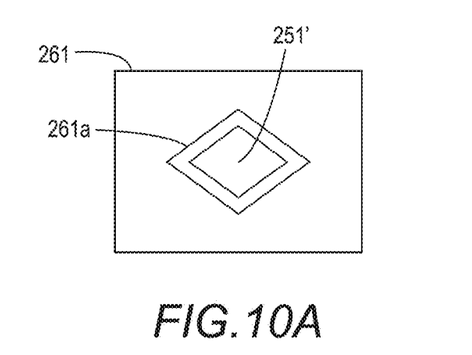
FIGS. 10A, 10B are top views of a non-circular pin extending through a non-circular hole in the movable plate of the pin array shown in FIGS. 7-8.
Figure 10B:
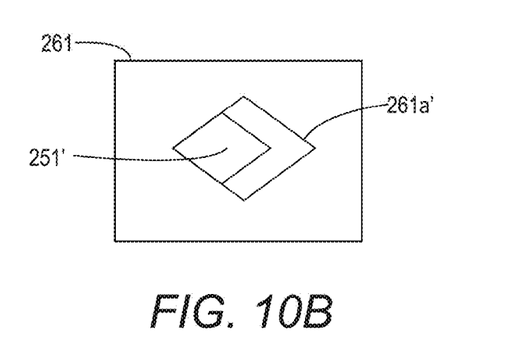

It is contemplated that the holes can have a non-circular cross-section to increase the points of contact between the pins and the holes in the plates. For instance, the holes can have a diamond configuration to provide two points of contact between the pin and the hole, as shown in FIGS. 9A-9B. Thus, as shown in FIG. 9A, the movable plate 261 can define a diamond shaped hole 261a to receive the circular cross-section pin 251. As the plate 261 is moved to the position shown in FIG. 9B, the pin 251 contacts two walls of the hole 261a. It can be appreciated that the corner of the diamond-shaped hole that receives the pin can be truncated, as shown by the dashed line in FIG. 9B. As a further alternative, the cross-section of the pin can be modified. In the example shown in FIGS. 10A-10B, the plate 261 with the diamond-shaped holes 261a can receive a pin 251' having a diamond-shaped cross-section. As the plate moves to the position shown in FIG. 10B, two walls of the pin 251' contact two walls of the hole 261a. It can be appreciated that the surface area of contact between the plate holes 261a and the pins 251, 251' can be increased, which thereby increases the frictional resistance to movement of the pins. It is contemplated that other cross-sectional shapes can be considered for the pins and corresponding holes, such as square or triangular. It is further contemplated that non-circular holes and pins can be implemented in the pin arrays 20, 200 described above.

It is also contemplated that the holes within the support plate assembly, and/or the surface of the pins, can include surface features to increase the frictional resistance to movement, as described above. Alternatively, the surface of the holes can be coated with a material adapted to enhance the frictional engagement, such as neoprene or rubber. The coating can also be compressible to enhance the frictional engagement. In a further alternative, the entire movable plate 261 can be formed of the compressible material, provided the plate is rigid enough to avoid buckling when actuated against the pins in the array.

It is contemplated that the holes in the movable plate 261 are slightly larger than the diameter of the pins 251. In one specific embodiment, the pins can have a diameter of 1 mm, so the holes in the movable plate can have a diameter of 1.1 mm. In this specific embodiment, transverse movement of the movable plate 261 by 0.05 mm will cause contact between the pins and the holes. For the non-circular holes, such as the holes 261a in FIGS. 9A-10B, the walls of the diamond shape can be sized to receive the circular pins of FIGS. 9A-9B, or the diamond-shaped pins 251' of FIGS. 10A-10B.

In order to reduce the clamping force required for a single movable plate 261, each support plate assembly 255, 256 can include the fixed plate arrangement 260 and movable plate 261. In this alternate embodiment, a clamping mechanism is provided with both support plate assemblies so that the frictional force needed to clamp the pins 251 can be shared by the two assemblies. It is also contemplated that the fixed plate arrangement 260 is not fixed but movable in the same manner as the movable plate 261, but in an opposite transverse direction. In this alternative, each pin is, in essence, sandwiched between the two plate arrangements 260, 261.

A translation mechanism 265 is provided that moves the movable plate 261 against a recovery spring 270. The recovery spring 270 is configured so that the plurality of holes in the movable plate 261 are aligned or colinear with the like plurality of holes in the fixed plate arrangement 260. As shown in FIG. 7, the translation mechanism 265 is supported by the frame 258 and can be configured to drive the movable plate 261 of one the support plate assembly 255, or both assemblies 255, 256 in the alternate embodiment. The translation mechanism can take many forms that are capable of controlled translation of the movable plate 261 and that are capable of holding the movable plate in its clamping position without any slippage of the pins during the etching process. For instance, the mechanism can include an actuation arm 266 connected to the movable plate 261. The arm is pivotably fixed to a lever 267 that is pivotable at a fulcrum 268 so that movement of the actuator end 267a of the lever away from the frame pushes the arm 266 transversely to the clamping position of the movable plate 261. The lever 267 can be moved manually but is preferably moved by a controllable motor in a known manner. As shown in FIG. 7, two arms 266 can be provided to drive a movable plate in both support plate assemblies 255, 256. It can be appreciated that other translation mechanisms can be utilized that are capable of moving the actuation arm 266 in the described manner.

In other embodiments, the translation mechanism 265 can constitute a lead screw or solenoid that acts directly on the movable plate 261 to move the plate transversely to apply the lateral force to the pins in the array. It is further contemplated that the movable plate 261 can be used in conjunction with a single support plate, such as support plate 25 shown in FIGS. 1-2. In this embodiment, the movable plate 261 is moved transversely relative to the fixed support plate 25 to exert a lateral clamping force on the pins of the array. The movable plate can be supported by the frame 20 between the support plate 25 and the enlarged heads 22 of the pins 21 in the array.

The lockable pin arrays disclosed herein provided for an improved method of extracting a build part from a 3D or additive manufacturing machine. The additive manufacturing process applies the successive layers onto an interposer panel 10 that is supported by the build plate B, rather than directly on the build plate. Once the build part P has been fabricated, the build part is brought into contact with a pin array, such as the array 20, 200 or 250. In one embodiment, the pin array is arranged above the interposed panel 10, as shown in FIG. 1A, and is moved downward to the position shown in FIG. 2A in which the pins of the array contact the contour C of the completed build part. In an alternative approach, the build plate can be inverted with the build part and positioned above the pin array, and then moved downward onto the pin array to a position that is inverted form the orientation shown in FIG. 2A.

Once the entire contour of the build part has been contacted, the pins of the pin array can be locked in position using one of the locking components described herein. The locking mechanisms disclosed herein can be manually or automatically actuated by way of a switch or electronic controller. With the pin array locked, the build part P and interposer panel 10 are inverted, as shown in FIG. 3 so that the build part is supported entirely by the pin array. It can be appreciated that this inversion can occur manually or with a mechanism capable of engaging the frame of the pin array, such as frame 28, 208, 258, and the back of the interposer panel and then rotating the frame. For instance, known robotic arms can be provided to automatically engage and invert the pin array, interposer panel and build part. It can be appreciated that in the alternative approach, the build plate is already inverted.

With the build part inverted, the sacrificial interposer panel is exposed facing upward. The enclosure 16 for the etchant bath 15 can be mounted on the back side of the interposer panel 10, as shown in FIG. 3. With the enclosure in place and sealed as described above, the chemical etchant can be added and maintained within the bath 15 for a sufficient time to dissolve and remove the sacrificial interposer panel. Once the panel has been removed the etchant bath can be drained, the enclosure 16 removed, and the finished build part P removed from the pin array. The locking component can be unactuated to release the pins and allow the pins to return to their neutral position. It can be appreciated that the pin array and locking component described herein are immediately reusable to extract another build part.

It will be appreciated that various of the above-disclosed and other features, and functions, or alternatives thereof, may be desirably combined into many other different systems or applications. A few of the alternative implementations may comprise various combinations of the methods and techniques described. Various presently unforeseen or unanticipated alternatives, modifications, variations, or improvements therein may be subsequently made by those skilled in the art, which are also intended to be encompassed by the following claims.

What is claimed is:

1. An apparatus for supporting a build part produced in an additive manufacturing process, the apparatus comprising: a pin array including; at least one support plate defining a plurality of parallel holes therethrough; and a like plurality of rigid elongated pins, each extending through a corresponding one of said plurality of parallel holes and slidable in a vertical direction relative to said corresponding one of said holes, and each including a tip at one end configured to contact a surface of the build part and an opposite end adjacent a surface of the support plate, each of the pins movable relative to said support plate by a force acting on the tip, as the pin array is moved toward the build part, to move the opposite end in the vertical direction away from said surface of the support plate; and a locking component for engaging each of the plurality of elongated pins to lock the pins against movement in the vertical direction relative to the support plate; said at least one support plate includes a pair of support plates offset from each other, each plate defining said plurality of parallel holes to receive the like plurality of pins therethrough; and said locking component includes; a compressible elastomeric composition disposed between said pair of plates, said elastomeric composition defining a like plurality of parallel holes to receive the plurality of pins therethrough; and a mechanism for moving one or both of said pair of plates toward the other of the pair of plates to compress said elastomeric composition so that the Poisson effect causes the elastomeric composition to press against said pins within said like plurality of holes in the composition, whereby the pins are locked by friction between the pins and the compressed elastomeric composition.

2. The apparatus of claim 1, wherein each pin of said pin array includes a biasing spring configured to bias the opposite end of the pins toward the surface of the support plate.

3. The apparatus of claim 1, wherein each pin has a circular cross-section and each hole is circular and sized for friction-free movement of a corresponding pin therethrough.

4. The apparatus of claim 1, wherein each pin has a circular cross-section and each hole has a non-circular shape and sized for friction-free movement of a corresponding pin therethrough.

5. The apparatus of claim 1, wherein each pin has a non-circular cross-section and each hole has a corresponding non-circular shape sized for friction-free movement of a corresponding pin therethrough.

6. The apparatus of claim 1, wherein said mechanism for moving includes a mechanical drive connected between said pair of plates and operable to move one or both of said pair of plates toward and away from the other plate.

7. The apparatus of claim 1, wherein said mechanism for moving includes: an electrode plate mounted on at least one of said pair of plates; and an electrical coil configured and arranged to generate an electromagnetic field that causes said electrode plate and said at least one of said pair of plates to move.

8. The apparatus of claim 1, wherein said mechanism for moving includes: an electrode plate mounted on each of said pair of support plates, the electrode plate of one of the pair of support plates electrically connected to a voltage source and the electrode plate of the other of the pair of support plates electrically connected to ground or to a different voltage source, whereby energizing the electrode plate of each of said pair of support plates generates an electrostatic potential between the electrode plates operable to move the pair of support plates toward each other.

* * * * *